(12) United States Patent
DeHaan et al.

(10) Patent No.: US 9,466,049 B2
(45) Date of Patent: Oct. 11, 2016

(54) ANALYZING ACTIVITY PATTERNS IN ONLINE COMMUNITIES

(75) Inventors: Michael Paul DeHaan, Morrisville, NC (US); Gregory Alexander Reasoner DeKoenigsberg, Durham, NC (US)

(73) Assignee: Red Hat, Inc., Raleigh, NC (US)

( * ) Notice: Subject to any disclaimer, the term of this patent is extended or adjusted under 35 U.S.C. 154(b) by 1776 days.

(21) Appl. No.: 12/324,625

(22) Filed: Nov. 26, 2008

(65) Prior Publication Data

US 2010/0131860 A1   May 27, 2010

(51) Int. Cl.
*G06F 3/0481*   (2013.01)
*G06Q 10/10*   (2012.01)
*G06F 3/0484*   (2013.01)
*H04L 29/08*   (2006.01)

(52) U.S. Cl.
CPC ............ *G06Q 10/10* (2013.01); *G06F 3/0481* (2013.01); *G06F 3/0484* (2013.01); *G06F 3/04842* (2013.01); *H04L 67/02* (2013.01); *H04L 67/22* (2013.01); *H04L 67/306* (2013.01)

(58) Field of Classification Search
CPC .... G06F 3/048; G06F 3/0481; G06F 3/0484; G06F 3/04842; H04L 65/403; H04L 67/10; G06Q 10/10
USPC .................................. 715/751, 753; 709/204
See application file for complete search history.

(56) References Cited

U.S. PATENT DOCUMENTS

| | | | |
|---|---|---|---|
| 7,143,357 B1* | 11/2006 | Snibbe et al. ................ | 715/751 |
| 7,774,378 B2* | 8/2010 | Nelson .......................... | 707/803 |
| 2003/0028595 A1* | 2/2003 | Vogt ....................... | G06Q 10/10 709/204 |
| 2004/0111467 A1* | 6/2004 | Willis .......................... | 709/203 |
| 2004/0122939 A1* | 6/2004 | Perkins ........................ | 709/224 |
| 2007/0214097 A1* | 9/2007 | Parsons et al. ................ | 706/12 |
| 2007/0226628 A1* | 9/2007 | Schlack ........................ | 715/733 |
| 2007/0233291 A1* | 10/2007 | Herde et al. .................... | 700/91 |
| 2008/0046484 A1* | 2/2008 | Ellis et al. .................... | 707/204 |
| 2008/0215607 A1* | 9/2008 | Kaushansky et al. ........ | 707/102 |
| 2008/0229214 A1* | 9/2008 | Hamilton et al. ............. | 715/751 |
| 2009/0006341 A1* | 1/2009 | Chapman ......................... | 707/3 |
| 2010/0057682 A1* | 3/2010 | Ramsay et al. ................... | 707/3 |
| 2010/0100554 A1* | 4/2010 | Carter .......................... | 707/748 |

\* cited by examiner

*Primary Examiner* — Tuyetlien T Tran
(74) *Attorney, Agent, or Firm* — Lowenstein Sandler LLP

(57) ABSTRACT

Embodiments relate to systems and methods for analyzing patterns and trends in online communities, and more particularly to organizing and analyzing data from community collaboration platforms and websites such as wikis, mailing lists, bug trackers, project management tools, and version control systems. At least one collaboration space can contain and store topics which can be submitted to and accessible by a plurality of users. The plurality of users can start new topics or add to existing topics within the at least one collaboration space. The at least one collaboration space can organize data within the topics according to various attributes of the data and the topics. The at least one collaboration space can send the organized data to a dashboard, which can create data organization aids to analyze the data.

17 Claims, 5 Drawing Sheets

ANALYZING ACTIVITY PATTERNS IN ONLINE COMMUNITIES

FIELD

The present teachings relate to systems and methods for analyzing activity patterns in online communities, and more particularly to organizing and analyzing data from community collaboration platforms and websites such as wiki sites, mailing lists, version control systems, project management tools, and bug trackers.

BACKGROUND OF RELATED ART

Community collaboration platforms and websites are known which allow members from a public or private community to contribute to or modify content which is shared on the platforms and websites. Some forms of these platforms and websites can comprise wikis, mailing lists, version control systems, bug trackers, and project management tools such as, for example, "Trac." In particular, software developers utilize wikis as a platform for the developers and the community to share information with the goal to help solve the software problem or issue presented. Further, software developers utilize mailing lists, project management systems, and/or bugtrackers to submit updates, problems, fixes, and/or the like to accomplish the same goals. Opening up the platform to a community often facilitates the development of the software by providing users a platform to easily and freely submit and exchange updates and ideas.

Existing collaboration platforms and software wikis provide no mechanism to organize and analyze the updates submitted to and information exchanged within the platforms and utilities, such as, for example, analyzing the proportions of which groups are contributing to the updates and exchanging information, predicting the market for a new piece of software, determining the quality of the software idea, and/or performing other analyses.

DESCRIPTION OF DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

For simplicity and illustrative purposes, the principles of the present teachings are described by referring mainly to exemplary embodiments thereof. However, one of ordinary skill in the art would readily recognize that the same principles are equally applicable to, and can be implemented in, all types of collaboration environments, and that any such variations do not depart from the true spirit and scope of the present teachings. Moreover, in the following detailed description, references are made to the accompanying figures, which illustrate specific embodiments. Electrical, mechanical, logical and structural changes may be made to the embodiments without departing from the spirit and scope of the present teachings. The following detailed description is, therefore, not to be taken in a limiting sense and the scope of the present teachings is defined by the appended claims and their equivalents.

Embodiments of the present teachings relate to systems and methods for organizing a collaboration environment. More particularly, the systems and methods can access data in at least one collaboration space contributed by a plurality of users. The systems and methods can identify categories of the data associated with the activity of a group of users. The systems and methods can generate a report indicating the categories of the data associated with each user in the plurality of users. These and other embodiments described herein provide a network operator or other user with enhanced analytic capability, without a need to manually inspect the updates and additions made to the at least one collaboration space by individual users.

Reference will now be made in detail to exemplary embodiments of the present teachings, which are illustrated in the accompanying drawings. Where possible the same reference numbers will be used throughout the drawings to refer to the same or like parts.

Figure 1:
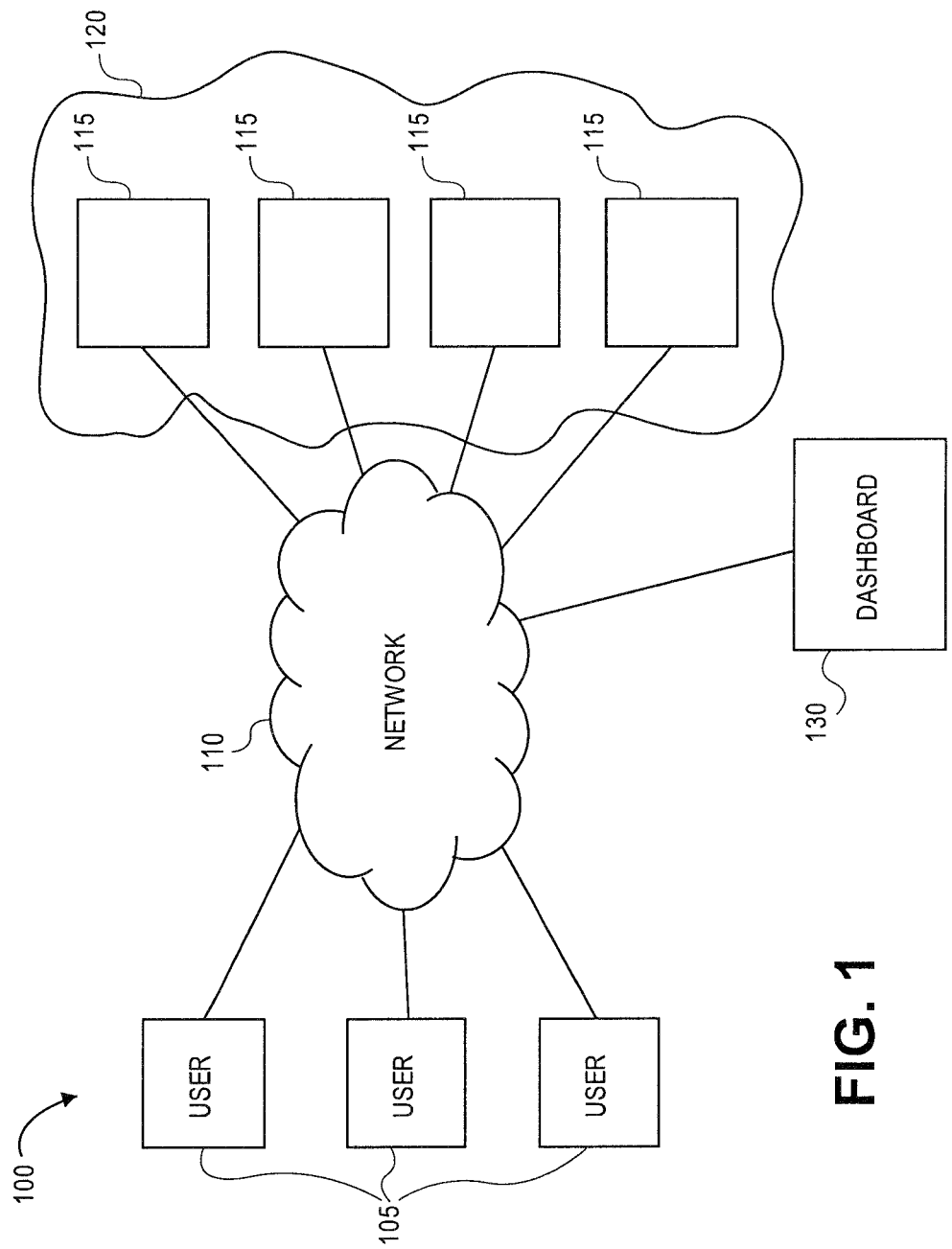
FIG. 1 illustrates an overall system of an online community, according to various embodiments of the present teachings.

FIG. 1 illustrates an overall system 100 of an online community, according to various embodiments of the present teachings. Embodiments described herein can be implemented in or supported by the exemplary environment illustrated in FIG. 1. The overall system 100 can provide a collaboration space environment 120, which comprehensively manages the tasks related to user collaboration.

In embodiments as shown in FIG. 1, a plurality of users 105 can access resources including a network 110, the collaboration environment 120, and a dashboard 130. The network 110 can be implemented on one or more servers or on other hardware, and can provide a gateway for the plurality of users 105 to access the collaboration environment 120. The network 110 can for example be or include a personal area network, a local area network, a metropolitan area network, a wide area network, the Internet, an intranet, an extranet, a virtual private network, a peer-to-peer network, a wireless self-configuring network, or other networks or connections.

The plurality of users 105 can connect to the collaboration environment 120 through the network 110. The collaboration environment 120 can include one or more collaboration spaces 115. Each of the one or more collaboration spaces 115 can be created and/or moderated by one of the plurality of users 105, or by another internal or external user. In embodiments, the one or more collaboration spaces 115 can each correspond to an appropriate platform or utility such as, for example, a wiki, a mailing list, a version control system, a bug tracker, a project management tool, and similar data tracking and collaborating utilities. The one or more collaboration spaces 115 can be connected to the network 110 and can be configured to communicate with each other. The one or more collaboration spaces 115 can be configured to gather and house data from other utilities or collaboration spaces such as, for example, a mailing list, without actually gathering collaboration data from outside users.

The one or more collaboration spaces 115 can be configured to be used as a public collaboration environment, or in a business as an intranet or knowledge management system.

The one or more collaboration spaces 115 can be implemented or supported using known components of hardware, software, or combinations thereof. For example, the one or more collaboration spaces 115 can be written in suitable programming languages, such as Java, C++, Python code, and the like to accommodate a variety of operating systems, machine architectures, etc. In embodiments, the one or more collaboration spaces 115 can be implemented via servers or other hardware accessible though a variety of operating systems, machine architectures, etc.

The plurality of users 105 can include users with access to the network, such as, for example, public users or business employees. The plurality of users 105 can therefore comprise of any combination of users who create, submit to, and moderate the one or more collaboration spaces 115, and outside users who have access to the one or more collaboration spaces 115. In embodiments, access to submit to or update the one or more collaboration spaces 115 can be configured to require authentication of users of the plurality of users 105.

The one or more collaboration spaces 115 can be configured to be or include an environment or a collection of web pages designed to enable the plurality of users 105 to access, contribute and/or modify content contained therein. Further, the one or more collaboration space can be configured to store data submitted by the plurality of users 105 such as, for example, a mailing list, a version control system, a bug tracker, or a project management tool. The one or more collaboration spaces 115 can be configured with a storage means such as, for example, a database. The storage means can be configured to store and maintain the data contained in the one or more collaboration spaces 115. The storage means can be implemented as a standard database. The storage means can be implemented using known database technology, such as relational databases, object oriented databases, or other databases or data stores.

The one or more collaboration spaces 115 can be configured to allow an environment for user collaboration such as, for example, a wiki. The one or more collaboration spaces 115 can further be configured to store data submitted by users or gathered from utilities. For example, the one or more collaboration spaces 115 can be configured to receive bug tracking data from a bug tracking application. The one or more collaboration spaces 115 can include various content that can be categorized into separate technical or other topics, problems, forums, or other areas. For example, the one or more collaboration spaces 115 can include a page or topic area focused on the improvement of a certain aspect of a software program. The content can for instance include content in the form of email, a blog update, an uploaded file, forum discussions, an IRC chat, a website, and other forms of communication. The plurality of users 105 can start new topics, problems, or other areas within the one or more collaboration spaces 115. The plurality of users 105 can add content to or modify existing content within the topics, problems, or other areas in the one or more collaboration spaces 115. The plurality of users 105 can add comments or ideas about existing content, or can add comments or ideas on content that has not yet been added to the one or more collaboration spaces 115.

The plurality of users 105 can choose which topics, problems, or other areas that they want to start or address. For example, one of the plurality of users 105 can choose a topic relating to an improvement of a software program, and can then add or modify content to that topic. Further, for example, one of the plurality of users 105 can start a new topic, problem, or other area addressing an improvement of a software program. When one of the plurality of users 105 adds new content, modifies existing content, poses a question, makes a comment, or performs any other change to the topic in the one or more collaboration spaces 115, the data in the one or more collaboration spaces 115 can be accordingly updated to reflect the change. The updated can be performed such that any of the plurality of users 105 can access the updated content once the update is made. The one or more collaboration spaces 115 can include a revision history such that any addition or modification is stored in the database 120 and is viewable to the plurality of users 105. The plurality of users 105 can access the revision history to locate and view additions or modifications contained therein.

In embodiments, the one or more collaboration spaces 115 can be configured to gather and store data from the plurality of users 105, and from application programs and utilities. The one or more collaboration spaces 115 can each correspond to different data mining and collaborating utilities such as, for example, mailing lists, version control systems, bug trackers, project management tools, and similar data tracking and collaborating utilities. The one or more collaboration spaces 115 can be configured to communicate with and send data to each other.

When one of the plurality of users 105 or a data mining utility submits or modifies content in the one or more collaboration spaces 115, the one or more collaboration spaces 115 can make a data record. The data record can include data relating to the submission or modification of the content such as, for example, the user's email address, username and location, a timestamp, an indication of the user's activity within the one or more collaboration spaces 115, a category of the topic or project being submitted or modified, and other data types. For example, the data record can indicate that the project being updated, modified, or submitted is related to hardware, a software improvement, a part of a development environment, or other areas. The data record can also include what type of change the user makes such as, for example, a code addition or modification, a comment, a question, and other changes. The data record can be stored in the storage means along with the content in the one or more collaboration spaces 115.

The dashboard 130 can be configured to connect to the network 110 and to the one or more collaboration spaces 115. The dashboard 130 can be configured to receive, read, analyze, and/or modify data records and other content from the one or more collaboration spaces 115, the storage means, and/or the network 110.

The dashboard 130 can be a useful tool for a user to analyze one or more relationships contained in the data records and other content within the one or more collaboration spaces 115. For example, the one or more collaboration spaces 115 can be created and maintained by a company, organization, or other group. Further, different topics or projects within the one or more collaboration spaces 115 can be created, accessed, and submitted to by outside parties, or users within the company, organization, or other group. The dashboard 130 can compare the number of submissions or updates in a given topic or project by outside parties to the number of submissions or updates by users within the group which creates or maintains the one or more collaboration spaces 115.

The dashboard 130 can gauge that if, for example, a topic or project has many collaboration submissions from outside users with outside domain emails or if a stored mailing list has a lot of submitted fixes, then there can be an increased likelihood that the topic or project has a high commercial interest, that the topic or project contains problems or errors, that the topic or project requires patches, or other indications. In contrast, if a topic or project has few collaboration submissions from outside users or if a stored mailing list has few submitted fixes, then there can for instance be a perceived likelihood that the topic or project has a comparatively lower commercial interest, that the topic or project contains few problems or errors, that the topic or project requires few patches, or other indications. Further, the dashboard 130 can identify individual areas of a topic or project that are being most investigated, which can help pinpoint which individual areas may need the most attention or may have the most commercial interest. Similarly, the dashboard 130 can use the data to determine which topics, projects, or parts thereof may not be worth pursuing from a business standpoint.

The dashboard 130 can be configured to automatically calculate, organize, output, store, or display data for viewing or use by a user. In embodiments, a user can configure the dashboard 130 to create and send reports, graphs, charts, lists, tables, display devices, or other forms of data organization based on customizable data criteria. For example, a user can configure the dashboard to create a daily, weekly, monthly, or other graph of the topics in the one or more collaboration spaces 115 which receive the most updates and submissions from outside utilities or from the plurality of users 105.

The dashboard 130 can be implemented as hardware, software, or combinations thereof. The dashboard 130 and can be configured to run on any or all of the one or more collaboration spaces 115, or execute remotely on a separate computer system as illustrated. For example, the dashboard 130 can integrate with the software or hardware of the one or more collaboration spaces 115, or can be written separately in a variety of programming languages, such as Java, C++, Python code, and the like to accommodate a variety of operating systems, machine architectures, etc.

Figure 2:
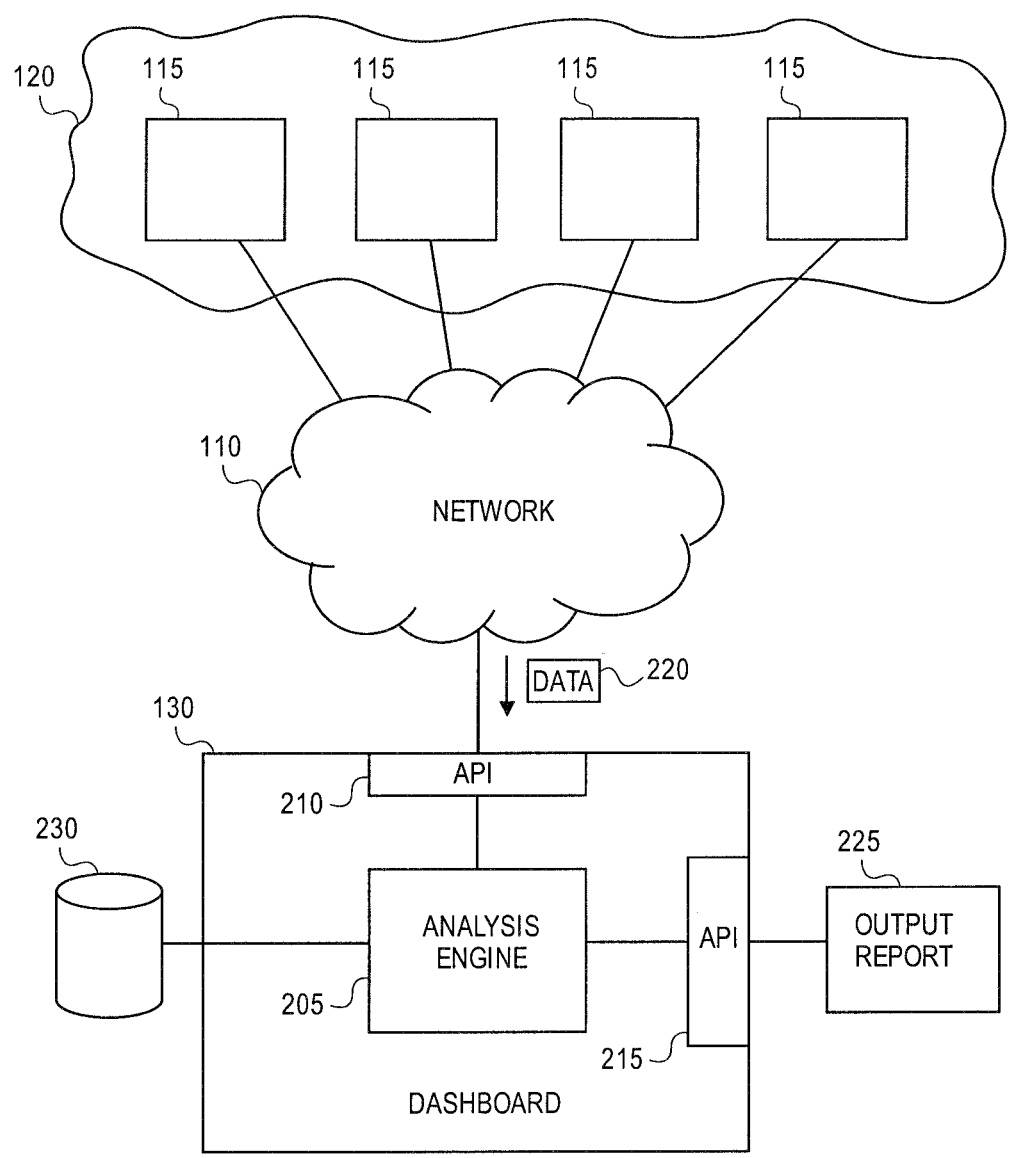
FIG. 2 illustrates a detailed overview of an online community, according to various embodiments.

FIG. 2 illustrates a detailed overview of an online community according to various embodiments of the present teachings. FIG. 2 includes the collaboration environment 120, the one or more collaboration spaces 115, the network 110, and the dashboard 130 as shown in FIG. 1. The dashboard 130 as shown in FIG. 2 can be configured with an analysis engine 205, an input application programming interface (API) 210, and an output API 215. The input API can be configured to receive or retrieve the data 220 from the network 110 and the one or more collaboration spaces 115. The data 210 can comprise the data records created in the one or more collaboration spaces 115. The data 210 can represent the submissions and contributions of the plurality of users 105 within the collaboration environment 120.

The analysis engine 205 can be configured to contain logic to perform the receiving, organizing, and outputting as described below. The analysis engine 205 can be configured to connect to the input API 210 and the output API 215. The analysis engine 205 can further be configured to receive or retrieve the data 220 from the input API 210. The analysis engine 205 can further be configured to read, analyze, consolidate, and/or modify the data 220 received from the input API 210.

The analysis engine 205 can be configured to organize the data 220 into the type of submission or modification such as, for example, emails, source code, blog posts, file uploads, forum discussions, IRC chats, websites, and other forms of submission and modification. For example, the analysis engine 205 can extract and organize user-related attributes from the data 220 such as, for example, the user's email address, user name and location, timestamp, an indication of the user's activity within the one or more collaboration spaces 115, and other data attributes stored in the data 220. The analysis engine 205 can be configured to organize the extracted information from the data 210, and output the organized information to the output API 215. For example, the analysis engine 205 can be configured to organize and output a list of the emails of the plurality of users 105 who submit and modify content in a particular topic or problem in the one or more collaboration spaces 115. In embodiments, the analysis engine 205 can store data and information in a data repository 230.

The dashboard 130 can be configured to connect with the one or more collaboration spaces 115 through the input API 210. The input API 210 can be configured to request or receive additional data from the one or more collaboration spaces 115. For example, the dashboard 130 can request the email addresses of the users who have contributed to a particular topic or problem in the one or more collaboration spaces 115, and the dashboard 130 can retrieve the email addresses and send them to the analysis engine 205.

The analysis engine 205 can be configured to create reports, graphs, charts, lists, tables, display devices, or other forms of data organization. For example, the analysis engine 205 can create a chart detailing the relative proportions of all of the email addresses of users of the plurality of users 105 who have contributed to a particular topic presented in the one or more collaboration spaces 115. For further example, the analysis engine 205 can create a report indicating the identity of the domain names from which users have emailed content into the one or more collaboration spaces 115, and/or the relative proportions of email or other traffic received from specific domains. For still example, the analysis engine 205 can be configured to create a graph detailing the relative update activity of particular topics presented in the one or more collaboration spaces 115.

The analysis engine 205 can be configured to send output data and other content to an outside user, network, computer, or any other software or hardware component via the output API 215 in the form of an output report 225. The output report 225 can be a report, list, or other record or form of data organization. For example, the output report 225 can be a chart of all of the email addresses of users of the plurality of users 105 who have contributed to a particular topic presented in the one or more collaboration spaces 115. In embodiments, output report 225 can be received by an outside component for storage or display such as, for example, a hard drive, server, monitor, touch screen, or other device used to store or display data.

In embodiments, a user can use the dashboard 130 to customize the data received from the one or more collaboration spaces 115 and to create reports, graphs, charts, lists, tables, or other records or forms of data organization. The user can customize the data organization aids and their associated content for personal use, presentations, temporary use, or for other reasons. The dashboard 130 or the user of the dashboard 130 can customize the data or to send the output report 225 to another client, computer, server, or other storage system. The dashboard 130 or the user of the dashboard 130 can create data organization aids using any or all of the attributes from any or all parts of the output data, including, for example, emails, source code, blog posts, file uploads, forum discussion, IRC chats, websites and other forms of submission and modification.

Figure 3:
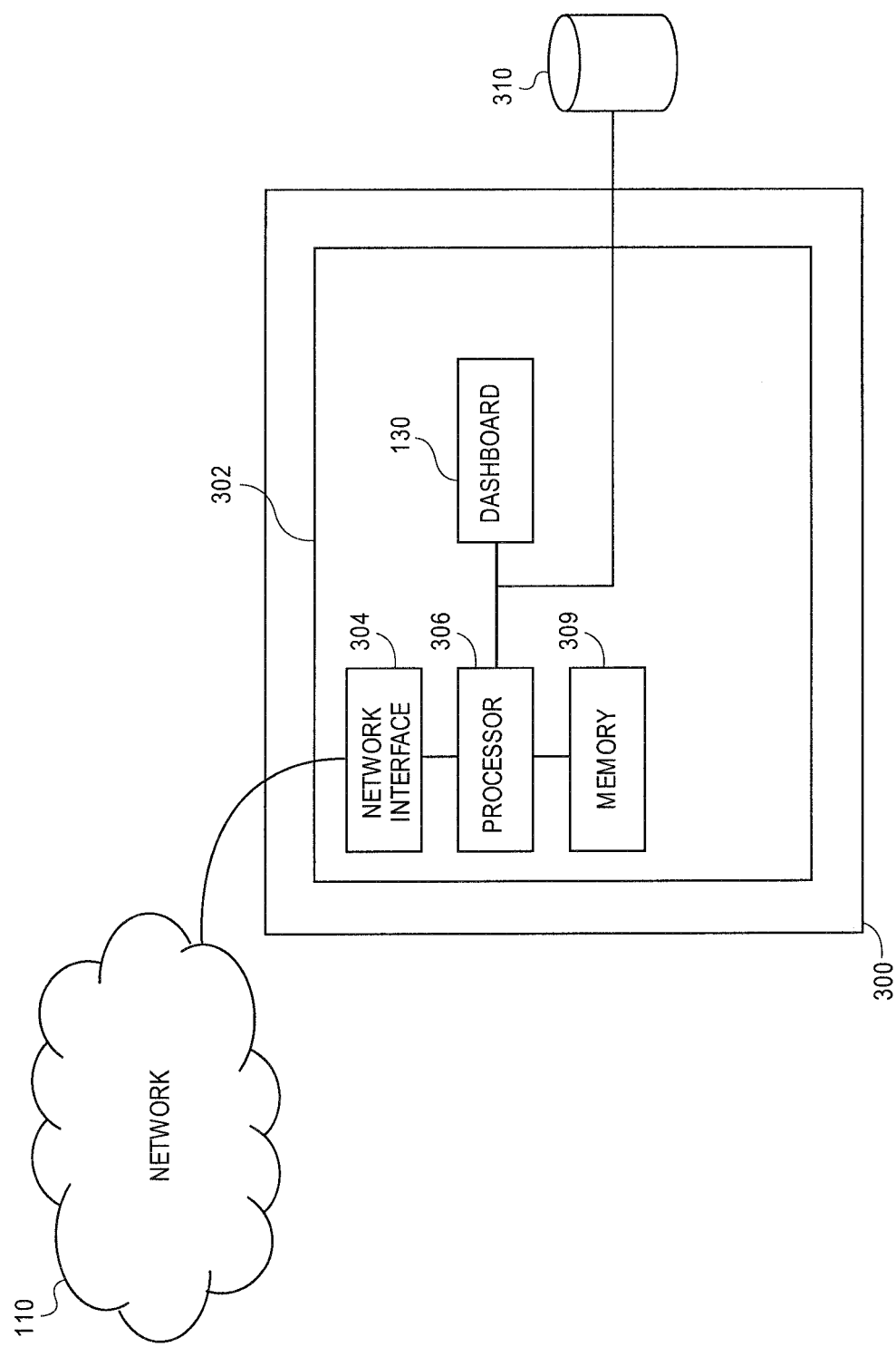
FIG. 3 illustrates an exemplary diagram of a computer system, according to various embodiments.

FIG. 3 illustrates an exemplary computer system 300, according to various embodiments. The computer system 300 can be configured to communicate with the network 110. In embodiments as shown, the computer system 300 can comprise a processor 306 communicating with memory 308, such as electronic random access memory, operating under control of or in conjunction with an operating system 302. The operating system 302 can be, for example, a distribution of the Linux™ operating system, the Unix™ operating system, or other open-source or proprietary operating system or platform. The processor 306 also communicates with a repository 310. While illustrated as a remote repository in the computer system 300, the repository 310 can be local within the computer system 300, and the computer system 300 can be configured to communicate with the repository 310.

The processor 306 further communicates with a network interface 304, such as an Ethernet or wireless data connection, which in turn communicates with one or more networks 110, such as the Internet or other public or private networks. The processor 306 also communicates with the memory 302, the network interface 304, and the repository 310 to execute control logic and perform the assignments and processes described above. The processor 306 can further communicate with the dashboard 130 to execute the functions described in embodiments. Other configurations of the computer system 300, associated network connections, and other hardware and software resources are possible.

Figure 4:
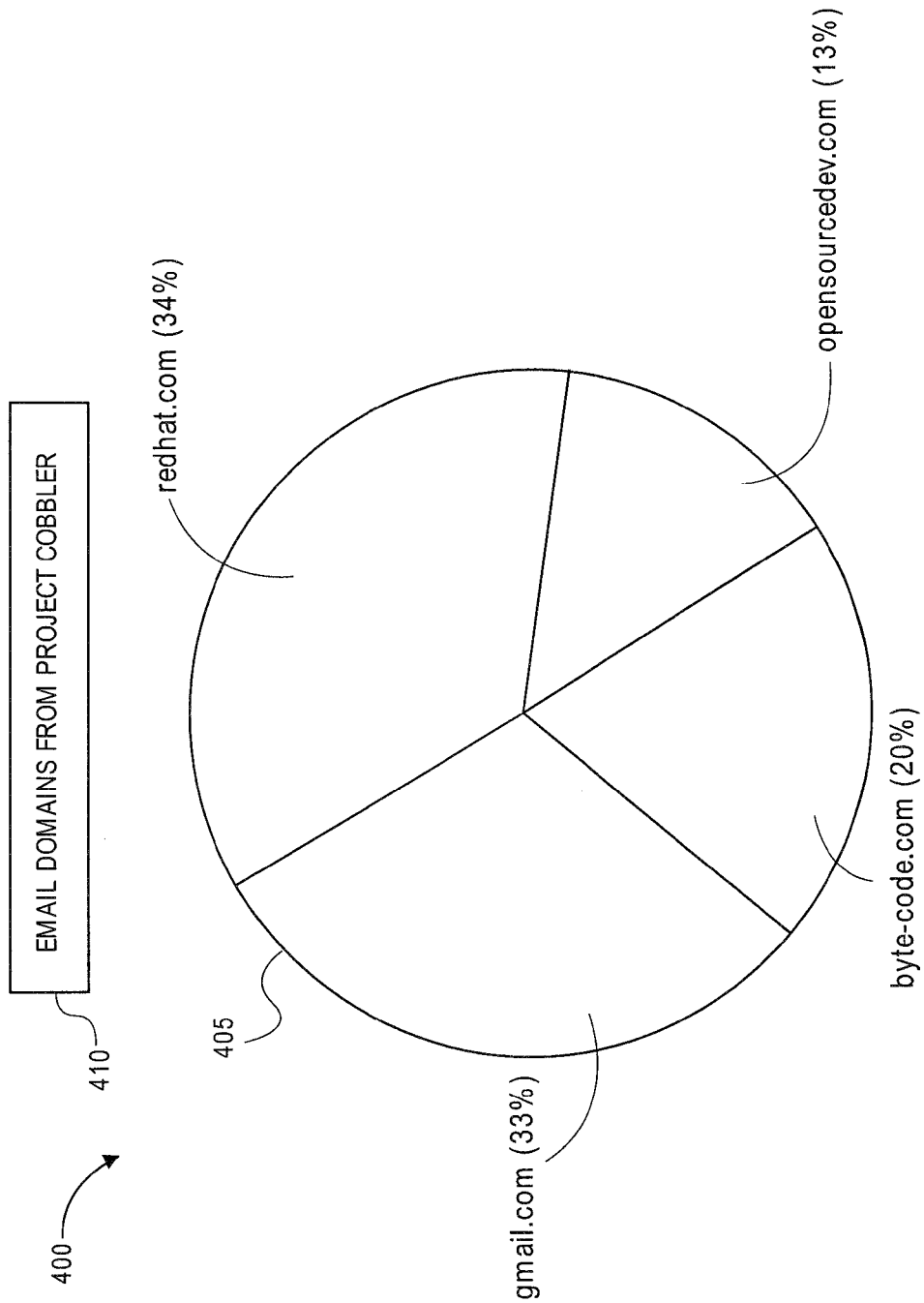
FIG. 4 illustrates an exemplary output diagram, according to various embodiments.

FIG. 4 is an exemplary output diagram 400 composed of collaboration data, according to various embodiments. The output diagram 400 can be created from the output report 225 sent from the analysis engine 205 in the dashboard 130 via the output API 215. The output diagram 400 can created by the analysis engine 205 or by an end component which receives the output report 225.

Output diagram 400 as shown in FIG. 4 includes a pie chart 405 and a title bar 410. As shown in FIG. 4, the title bar 410 includes a title generally relevant to the pie chart 405. The output diagram 400 refers to a project in the one or more collaboration spaces 115 relating to a software product, such as "Cobbler." Further, the pie chart 405 in the output diagram 400 contains the email domains of users who update or contribute to the "Cobbler" project in the one or more collaboration spaces 115. The pie chart 405 details the proportions of the email domains of users who update the "Cobbler" project. For example, users with the email domain "redhat.com" make 34% of the updates and contributions to the "Cobbler" project, users with the email domain "gmail.com" make 33% of the updates and contributions to the "Cobbler" project, and according percentages of the email domains "byte-code.com" and "opensourcedev.com" as shown in FIG. 4. In embodiments, the output diagram 400 can display the total number of updates and contributions to the "Cobble" project. Further, in embodiments, the output diagram 400 can be configured to display any type of organization of the output data contained in the one or more collaboration spaces 115 in accordance with the embodiments of the present teachings as described above.

Figure 5:
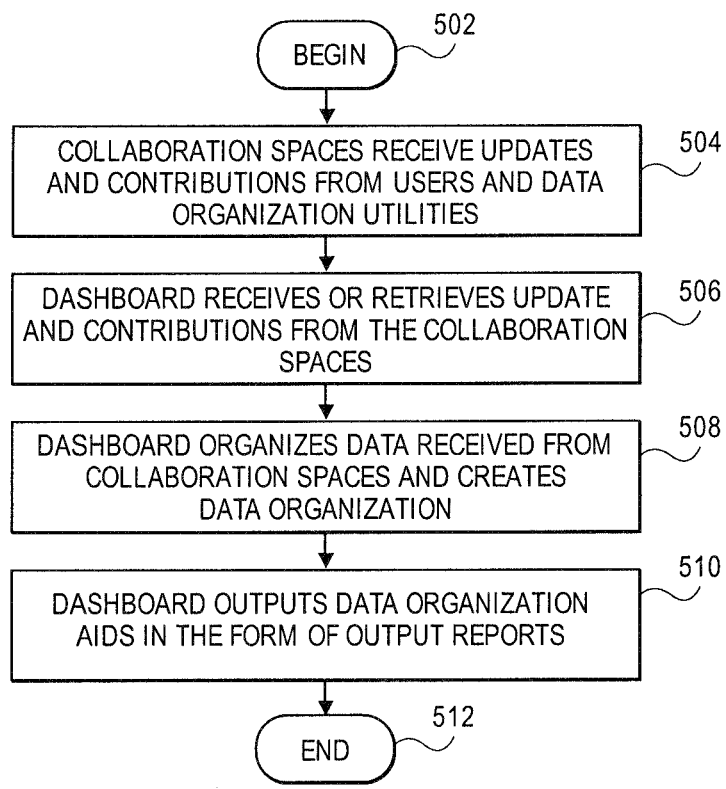
FIG. 5 illustrates a flowchart of overall processing of the online community, according to various embodiments.

FIG. 5 illustrates a flowchart of overall processing of the online community, according to various embodiments of the present teachings. In 502, processing can begin. In 504, the one or more collaboration spaces 115 can receive updates and contributions from users and data organization utilities. For example, the plurality of users 105 can contribute to a topic within a wiki. In 506, the dashboard 130 can retrieve or receive the updates and contributions from the one or more collaboration spaces 115. In 508, the dashboard 130 can organize the data received from the one or more collaboration spaces 115 and create data organization aids. In 510, the dashboard 130 can output the data organization aids in the form of output reports. For example, the dashboard can create a pie graph such as the one depicted in FIG. 4. In 512, processing can repeat, return to a prior processing point, jump to a further processing point, or end.

The foregoing description is illustrative, and variations in configuration and implementation may occur to persons skilled in the art. For example, resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
    accessing, by a processor, data contributed by a plurality of users to a collaboration space, the data comprising the email address associated with each of the plurality of users contributing to the collaboration space in association with a topic;
    determining, by the processor, a domain name of each of the email addresses contributing to the collaboration space in association with the topic, a type of contribution made by each of the plurality of users, and a number of a first type of contribution associated with the topic;
    receiving, via a dashboard interface, customized data criteria identifying the topic and a threshold number of the first type of contribution associated with the topic;
    determining a level of importance associated with the topic in view of the number of the first type of contribution exceeding the threshold number of the first type of contribution; and
    generating, by the processor, a report comprising a relative proportion of domain names of the email addresses contributing to the collaboration space in association with the topic, information associated with the first type of contribution made by each of the plurality of users, and a category of the data in a display form.

2. The method of claim 1, further comprising storing the data and the report.

3. The method of claim 1, wherein the plurality of users access the collaboration space from a secure connection.

4. The method of claim 1, wherein the collaboration space is accessible via the Internet.

5. The method of claim 1, further comprising outputting the report to an end user.

6. The method of claim 1, wherein the report is requested by an end user.

7. A system comprising:
    a memory to store instructions; and
    a processor operatively coupled to the memory, the processor to execute the instructions to:
        access data contributed by a plurality of users to a collaboration space, the data comprising the email address associated with each of the plurality of users contributing via a network to the collaboration space in association with a topic and an indication of a type of contribution made by each of the plurality of users;
        determine a domain name of each of the email addresses contributing to the collaboration space in association with the topic, a type of contribution made by each of the plurality of users, and a number of a first type of contribution associated with the topic;

receive, via a dashboard interface, customized data criteria identifying the topic and a threshold number of the first type of contribution associated with the topic;

determine a level of importance associated with the topic in view of the number of the first type of contribution exceeding the threshold number of the first type of contribution; and generate a report comprising a relative proportion of domain names of the email addresses contributing to the collaboration space in association with the topic, the type of contribution made by each of the plurality of users, and a category of the data in a display form.

8. The system of claim 7, wherein the network comprises at least one of a personal area network, a local area network, a metropolitan area network, a wide area network, the Internet, an intranet, an extranet, a virtual private network, a peer-to-peer network, or a wireless self-configuring network.

9. The system of claim 7, the processor to store the data and the report.

10. The system of claim 7, the processor to output the report to an end user.

11. The system of claim 7, wherein the report is requested by an end user.

12. A non-transitory computer readable medium comprising instructions to cause a processor to:

access, by the processor, data contributed by a plurality of users to a collaboration space, the data comprising the email address associated with each of the plurality of users contributing to the collaboration space in association with a topic;

determine, by the processor, a domain name of each of the email addresses contributing to the collaboration space in association with the topic, a type of contribution made by each of the plurality of users, and a number of a first type of contribution associated with the topic; and receive, via a dashboard interface, customized data criteria identifying the topic and a threshold number of the first type of contribution associated with the topic;

determine a level of importance associated with the topic in view of the number of the first type of contribution exceeding the threshold number of the first type of contribution; and generate, by the processor, a report comprising a relative proportion of domain names of the email addresses contributing to the collaboration space in association with the topic, the type of contribution made by each of the plurality of users, and a category of the data in a display form.

13. The non-transitory computer readable medium of claim 12, the processor to cause storing of the data and the report.

14. The non-transitory computer readable medium of claim 12, wherein the plurality of users access the collaboration space from a secure connection.

15. The non-transitory computer readable medium of claim 12, wherein the collaboration space is accessible via the Internet.

16. The non-transitory computer readable medium of claim 12, the processor to output the report to an end user.

17. The non-transitory computer readable medium of claim 12, wherein the report is requested by an end user.

\* \* \* \* \*